(12) United States Patent
Link, II

(10) Patent No.: US 6,738,647 B1
(45) Date of Patent: May 18, 2004

(54) METHOD AND SYSTEM FOR EXPANDING THE DATA PAYLOAD OF DATA MESSAGES TRANSPORTED VIA A CELLULAR NETWORK CONTROL CHANNEL

(75) Inventor: Charles M. Link, II, Roswell, GA (US)

(73) Assignee: Numerex Corporation, Atlanta, GA (US)

( * ) Notice: Subject to any disclaimer, the term of this patent is extended or adjusted under 35 U.S.C. 154(b) by 0 days.

(21) Appl. No.: 09/549,761

(22) Filed: Apr. 14, 2000

Related U.S. Application Data

(60) Provisional application No. 60/130,790, filed on Apr. 23, 1999.

(51) Int. Cl.$^7$ .............................................. H04M 11/00
(52) U.S. Cl. ........................ 455/564; 455/435; 455/414
(58) Field of Search ................................ 455/432, 433, 455/445, 435, 414, 458, 564, 426, 411; 379/59

(56) References Cited

U.S. PATENT DOCUMENTS

| | | |
|---|---|---|
| 3,973,200 A | 8/1976 | Akerber |
| 4,172,969 A | 10/1979 | Levine et al. |
| 4,263,480 A | 4/1981 | Levine |
| 4,644,351 A | 2/1987 | Zabarsky et al. |
| 4,646,082 A | 2/1987 | Engel et al. |
| 4,750,197 A | 6/1988 | Denekamp et al. |
| 4,814,763 A | 3/1989 | Nelson et al. |
| 4,823,123 A | 4/1989 | Siwiak |
| 4,825,193 A | 4/1989 | Siwiak et al. |
| 4,825,457 A | 4/1989 | Lebowitz |
| 4,837,800 A | 6/1989 | Freeburg et al. |
| 4,866,445 A | 9/1989 | Valero et al. |
| 4,868,560 A | 9/1989 | Oliwa et al. |
| 4,875,038 A | 10/1989 | Siwiak et al. |
| 4,882,579 A | 11/1989 | Siwiak |
| 4,891,637 A | 1/1990 | Siwiak et al. |
| 4,905,234 A | 2/1990 | Childress et al. |
| 4,914,651 A | 4/1990 | Lusignan |

(List continued on next page.)

FOREIGN PATENT DOCUMENTS

| | | |
|---|---|---|
| WO | WO 95/24791 | 9/1995 |
| WO | WO 97/36435 | 10/1997 |
| WO | WO 9806227 | 2/1998 |

OTHER PUBLICATIONS

TIA/EIA IS–54–B Standard, pp. 115, 215–222.
TIA/EIA IS–41.5–C Standard pp. 24, 65, 206, 207.

(List continued on next page.)

*Primary Examiner*—Nay Maung
*Assistant Examiner*—Tan Trinh
(74) *Attorney, Agent, or Firm*—King & Spalding LLP

(57) ABSTRACT

A mobile station having the capability of inserting data content into the dialed digits field of a Call Origination signal issues a Call Origination signal to the mobile switching center ("MSC") servicing the cell in which the mobile station is located. In response to receiving the Call Origination signal, the MSC issues an Origination Request message to a visitor location register system ("VLR"). The MSC issues an Origination Request message rather than a Qualification Request message because of the prior setting of one or more appropriate call processing trigger(s) at the switch. The dialed digits field of the Origination Request message comprises data content from the dialed digits field of the Call Origination signal received by the MSC.

26 Claims, 7 Drawing Sheets

U.S. PATENT DOCUMENTS

| Patent No. | Date | Inventor(s) | Ref |
|---|---|---|---|
| 4,928,096 A | 5/1990 | Leonardo et al. | |
| 4,940,963 A | 7/1990 | Gutman et al. | |
| 4,993,059 A | 2/1991 | Smith et al. | |
| 5,005,014 A | 4/1991 | Jasinski | |
| 5,010,584 A | 4/1991 | Seki | |
| 5,031,204 A | 7/1991 | McKernan | |
| 5,047,763 A | 9/1991 | Kuznicki et al. | |
| 5,117,449 A | 5/1992 | Metroka et al. | |
| 5,124,697 A | 6/1992 | Moore | |
| 5,142,279 A | 8/1992 | Jasinski et al. | |
| 5,148,473 A | 9/1992 | Freeland et al. | |
| 5,153,582 A | 10/1992 | Davis | |
| 5,153,903 A | 10/1992 | Eastmond et al. | |
| 5,159,625 A | 10/1992 | Zicker | |
| 5,162,790 A | 11/1992 | Jasinski | |
| 5,175,758 A | 12/1992 | Levanto et al. | |
| 5,210,787 A | 5/1993 | Hayes et al. | |
| 5,218,367 A | 6/1993 | Sheffer et al. | |
| 5,220,599 A | 6/1993 | Sasano et al. | |
| 5,222,123 A | 6/1993 | Brown et al. | |
| 5,239,294 A | 8/1993 | Flanders et al. | |
| 5,239,678 A | 8/1993 | Grube et al. | |
| 5,255,307 A | 10/1993 | Mizikovsky | |
| 5,307,399 A | 4/1994 | Dai et al. | |
| 5,307,509 A | 4/1994 | Michalon et al. | |
| 5,341,410 A | 8/1994 | Aron et al. | |
| 5,363,427 A | 11/1994 | Ekstrom et al. | |
| 5,371,898 A | 12/1994 | Grube et al. | |
| 5,382,970 A | 1/1995 | Kiefl | |
| 5,396,537 A | 3/1995 | Schwendeman | |
| 5,396,539 A | 3/1995 | Slekys et al. | |
| 5,404,392 A | 4/1995 | Miller et al. | |
| 5,454,027 A | 9/1995 | Kennedy et al. | |
| 5,493,722 A | 2/1996 | Gunn et al. | |
| 5,502,761 A | 3/1996 | Duncan et al. | |
| 5,511,072 A | 4/1996 | Delprat | |
| 5,511,110 A | 4/1996 | Drucker | |
| 5,526,401 A | 6/1996 | Roach, Jr. et al. | |
| 5,528,664 A | 6/1996 | Slekys et al. | |
| 5,539,810 A * | 7/1996 | Kennedy et al. | 379/88.25 |
| 5,544,223 A | 8/1996 | Robbins et al. | |
| 5,544,225 A | 8/1996 | Kennedy, III et al. | |
| 5,546,444 A * | 8/1996 | Roach et al. | 455/412 |
| 5,594,740 A | 1/1997 | LaDue | |
| 5,596,573 A | 1/1997 | Bertland | |
| 5,610,973 A | 3/1997 | Comer | |
| 5,625,889 A | 4/1997 | Chikkaswamy et al. | |
| 5,652,570 A | 7/1997 | Lipkofker | |
| 5,680,551 A | 10/1997 | Martino, II | |
| 5,686,888 A | 11/1997 | Welles, II et al. | |
| 5,701,302 A | 12/1997 | Geiger | |
| 5,722,067 A | 2/1998 | Fougnies et al. | |
| 5,754,954 A | 5/1998 | Cannon et al. | |
| 5,781,612 A | 7/1998 | Choi et al. | |
| 5,794,144 A | 8/1998 | Comer et al. | |
| 5,797,097 A | 8/1998 | Roach, Jr. et al. | |
| 5,805,997 A | 9/1998 | Farris | |
| 5,826,195 A | 10/1998 | Kennedy et al. | |
| 5,845,203 A | 12/1998 | LaDue | |
| 5,845,211 A * | 12/1998 | Roach, Jr. | 455/436 |
| 5,862,481 A * | 1/1999 | Kulkarni et al. | 455/432 |
| 5,873,043 A | 2/1999 | Comer | |
| 5,898,917 A * | 4/1999 | Batni et al. | 455/564 |
| 5,913,166 A * | 6/1999 | Buttitta et al. | 455/436 |
| 5,924,026 A | 7/1999 | Krishnan | |
| 6,097,951 A * | 8/2000 | Ernam et al. | 455/433 |
| 6,108,540 A * | 8/2000 | Sonti et al. | 455/433 |
| 6,125,275 A * | 9/2000 | Comer et al. | 455/426 |
| 6,163,701 A * | 12/2000 | Saleh et al. | 455/456 |
| 6,169,895 B1 * | 1/2001 | Buhrmann et al. | 455/423 |
| 6,175,732 B1 * | 1/2001 | McDaniel et al. | 455/433 |
| 6,195,546 B1 * | 2/2001 | Leung et al. | 455/419 |
| 6,233,450 B1 * | 5/2001 | Seppanen | 455/426.1 |
| 6,397,056 B1 * | 5/2002 | Bugnon et al. | 455/411 |

OTHER PUBLICATIONS

"Mobile Cellular Telecommunications Systems", William C.Y. Lee, pp. 74–80, 1989.

The GSM System for Mobile Communications, Michel Mouly and Marie–Bernadette Paulet.

European Telecommunication Standard—Draft pr ETS 300 537, "European Digital Cellular Telecommunications System (Phase 2); Technical Realization of Short Message Service Call Broadcast (SMSCB)", European Telecommunications Standards Institute, Oct. 1993.

European Telecommunication Standard—Draft pr ETS 300 536, "European Digital Cellular Telecommunications System (Phase 2); Technical Realization of Short Message Service (SMS) Point to Point (PP)", European Telecommunications Standards Institute, Oct. 1993.

* cited by examiner

METHOD AND SYSTEM FOR EXPANDING THE DATA PAYLOAD OF DATA MESSAGES TRANSPORTED VIA A CELLULAR NETWORK CONTROL CHANNEL

RELATED PATENTS

The present application claims priority to U.S. Provisional Patent Application Serial No. 60/130,790 Apr. 23, 1999 entitled "Expansion of Data Payload for Data Message Transported via Cellular Network Control Channel" which is incorporated herein by reference.

The present application is also related to U.S. Pat. No. 5,546,444 entitled "Methods and Apparatus for Communicating Data Via a Cellular Network Control Channel" and is related to U.S. Pat. No. 5,526,401, entitled "Methods and Apparatus for Acknowledging a Paging Message Via a Cellular Network Control Channel," which are incorporated herein by reference.

FIELD OF THE INVENTION

The present invention is generally directed to data communications completed via a cellular mobile radiotelephone (CMR) system. More particularly described, the present invention supports the communication of increased data content from a mobile station to a data collection system via a mobile switching center (MSC) by utilizing the dialed digits field of CMR signals to carry the data content.

BACKGROUND OF THE INVENTION

In recent years, the communications industry has shown a growing interest in various types of wireless communications systems for communicating data between a remote site and a central location. It is well recognized that the use of a dedicated telephone facility for a conventional telephone system is not a convenient, economical, or practical option for all communications applications. For example, a home security system may be equipped with a device for transmitting information identifying the home to a monitoring system in the event of a break-in. While a conventional telephone link may be utilized to transmit the identifying information, a clever burglar could easily prevent the identifying information from being sent to the monitoring facility by disconnecting the telephone link outside the home. In view of problems such as these, the communications industry has developed wireless communications systems for communicating data in applications where a conventional telephone link is undesirable. One such system involves the use of a cellular network control channel in a cellular mobile radiotelephone (CMR) system to transport data messages.

While previous data communications systems for communicating a data message via the cellular network control channel of a CMR system are easily implemented because they operate within an industry-standard CMR system, these systems are not without drawbacks. For instance, in some previous systems the data path is achieved by altering the Electronic Serial Number (ESN) field of an Autonomous Registration signal (or Call Origination Signal) to carry data content instead of an identification characteristic. While useful in many business applications, such as security alarms, vehicle or cargo location, meter monitoring, etc., these previous data communications systems are limited by the size of the data that can be transported in the described manner via the cellular network control channel.

Other data communications systems have been developed that support data messaging over a CMR system by issuing a Feature Request message having data content within the dialed digits field. These systems are also not without drawbacks. In some such systems, a special activation code or identifying characteristic, such as an asterisk and/or one or more digits, is recognized by the MSC to enable the communication of data content from a mobile station to a home location register (HLR) system. In this manner, a messaging unit, such as a mobile station, can send data messages via the conventional CMR system by issuing a Feature Request message having encoded data content without use of a voice channel resource of the CMR system. However, at least a portion of the dialed digits field within the Feature Request message must be occupied by the identifying characteristic to support the transmission of the data content within the remaining portion of the dialed digits field. This identifying characteristic allows the use of a dedicated Feature Request message that may be intercepted by the MSC for transmission of encoded data content as a data message. This identifying characteristic creates a serious limitation of these previous systems because it drastically limits the amount of data that may be transmitted by occupying a portion of the space that could otherwise be used to carry data.

Accordingly, in light of the above problems, there is a need for a method and system for adapting an existing communications network to carry an increased data payload. There is a further need to adapt an existing communications network to deliver an increased data payload without the use of an identifying characteristic. There is an additional need for a method of adapting the existing architecture of a CMR system in a efficient and cost-effective manner to support an increased data payload via the CMR system. This new use of an existing communications network should have a minimum impact upon present communications carried by the system.

SUMMARY OF THE INVENTION

The present invention solves the problems described above by providing a method and system for expanding the data payload of data messages transported via a cellular network control channel. The present invention can advantageously use one or more call processing triggers at the mobile switching center (MSC) to substitute an IS41 Origination Request message carrying data content for the more typical Qualification Request message in connection with a mobile station having Per Call authorization. This substitution of the Origination Request message permits placement within the dialed digits field of data content, obtained from the Call Origination signal received at the MSC, for forwarding to the distant home location register (HLR) system associated with the mobile station. Significantly, the dialed digits field can be advantageously modified to contain only a data payload rather than the combination of data and an identifying characteristic that identifies data content within the dialed digits field.

More particularly described, the present invention supports data communication via the cellular mobile radiotelephone (CMR) system by the use of the dialed digits field within certain standard CMR system-compatible signals. Prior to data communication operations, a mobile station can issue an IS553 Autonomous Registration signal via the cellular network overhead control channel for processing by the MSC that serves the cell in which the mobile station is operational. This results in the transmission of an IS41 Registration Notification message to the HLR system that is associated with the mobile station. The HLR system can respond to the Registration Notification message by generating an Registration Notification RETURN RESULT having an Authorization Period field set to Per Call status. The visitor location register (VLR) system will construct a database entry in response to this Registration Notification RETURN RESULT, thereby causing the MSC to transmit subsequent IS41-compatible messages to the HLR system associated with the mobile station prior to any actual call delivery attempt. By setting one or more appropriate call processing triggers at the MSC, the switch can transmit an IS41 Origination Request message rather than the conventional IS41 Qualification Request message to the HLR system. In this manner, the MSC is programmed to seek authorization for any subsequent call origination by that mobile station based upon the use of an IS41 Origination Request message rather than the more conventional Qualification Request message. The trigger event for this message replacement can be set at the MSC prior to any communication of data content by the mobile station to a data collection system, typically hosted by the HLR system for that mobile station.

In response to a subsequent Call Origination signal by the mobile station, the MSC generates an IS41 Origination Request query to its VLR, which results in the forwarding of an Origination Request message to the HLR for that mobile station. Significantly, the Call Origination signal can contain data content within the dialed digits field of that IS553-compatible signal. Likewise, the dialed digits field of the IS41-compatible Origination Request signal contains this data content. The combination of the Call Origination signal and the Origination Request message, carried via the CMR system, results in the communication of data content as encoded information within those signals. Significantly, the entire dialed digits field of these CMR signals can be used to carry data content because the switch has previously been set up to communicate this data content to the HLR system associated within the originating mobile station.

The data payload in a modified Electronic Serial Number (ESN) field and the modified dialed digits field of the CMR signals utilized by the present invention can be combined to increase the data payload of a data message carried by a data communication system. In the alternative, the ESN field can be left unmodified, thereby leaving only the dialed digits field to carry a data payload within an Origination Request message in the manner described above.

The present invention achieves an increase in the data payload capacity for the data message. The present invention can forward up to 32 binary coded decimal (BCD) digits within the dialed digits field of an IS553 Call Origination signal to a mobile switching center (MSC). The MSC responds by transmitting an IS41 Origination Request message containing the encoded data to a data collection system implemented by a distant gateway, such as a home location register (HLR) system associated with the mobile station. The present invention can add to or substitute for the data payload capability of the data communications system utilizing the cellular network control channel to carry data by substituting data content for the entire dialed digits field of an IS553 Call Origination signal and causing an IS41 Origination Request message to forward that data to the distant gateway. The present invention does not need to use an identifying characteristic within the data stored in the dialed digits field to trigger a forwarding of the data payload via a Feature Request message. Consequently, the present invention increases the available data payload size by not consuming a portion of dialed digits field with an identifying characteristic that identifies data content, typically a "*" character and, in some cases, additional digits.

In this manner, the present invention advantageously provides a method and system for expanding the data payload of data messages transported via a cellular network control channel. That the present invention improves over the drawbacks of the prior art and accomplishes the objects of the invention will become apparent from the detailed description of the illustrative embodiment to follow.

DETAILED DESCRIPTION OF THE ILLUSTRATIVE EMBODIMENTS

The present invention is generally directed to a data communications system that supports the communication of a data message from a mobile station to a data collection system via a mobile switching center (MSC) of a cellular mobile radiotelephone (CMR) system. Advantageously, the present invention can alter the dialed digits field of an IS553 Call Origination Signal and an IS41 Origination Request message to carry data content rather than the dialed digits of a called telephone number. This enables the transportation of data content from a remote site associated with the mobile station to a centrally located data collection system via existing components of a CMR system based on the use of IS41 and IS553 compatible data communication links.

The present invention effectively exploits the known format of certain IS553 and IS41 signals to transport a data payload rather than the digits of a telephone number for a called party. The present invention also sets an appropriate call processing trigger at the MSC to enable the subsequent transmission of an IS41 Origination Request message, rather than a Qualification Request message, to a distant gateway, such as home location register (HLR) system, to support the communication of data content obtained from the dialed digits field of a Call Origination signal. Significantly, the entire dialed digits field of the IS553 Call Origination Signal and the IS41 Origination Request message can be used to carry a data payload, thereby providing an up to 32 digit capacity for data content transported via the CMR system. The present invention can be used to supplement the data communications capability described in the '444 and '401 patents, or can be implemented as a stand-alone solution to the problem of communicating an expanded data payload via an existing CMR system without the use of a voice channel.

Figure 1:
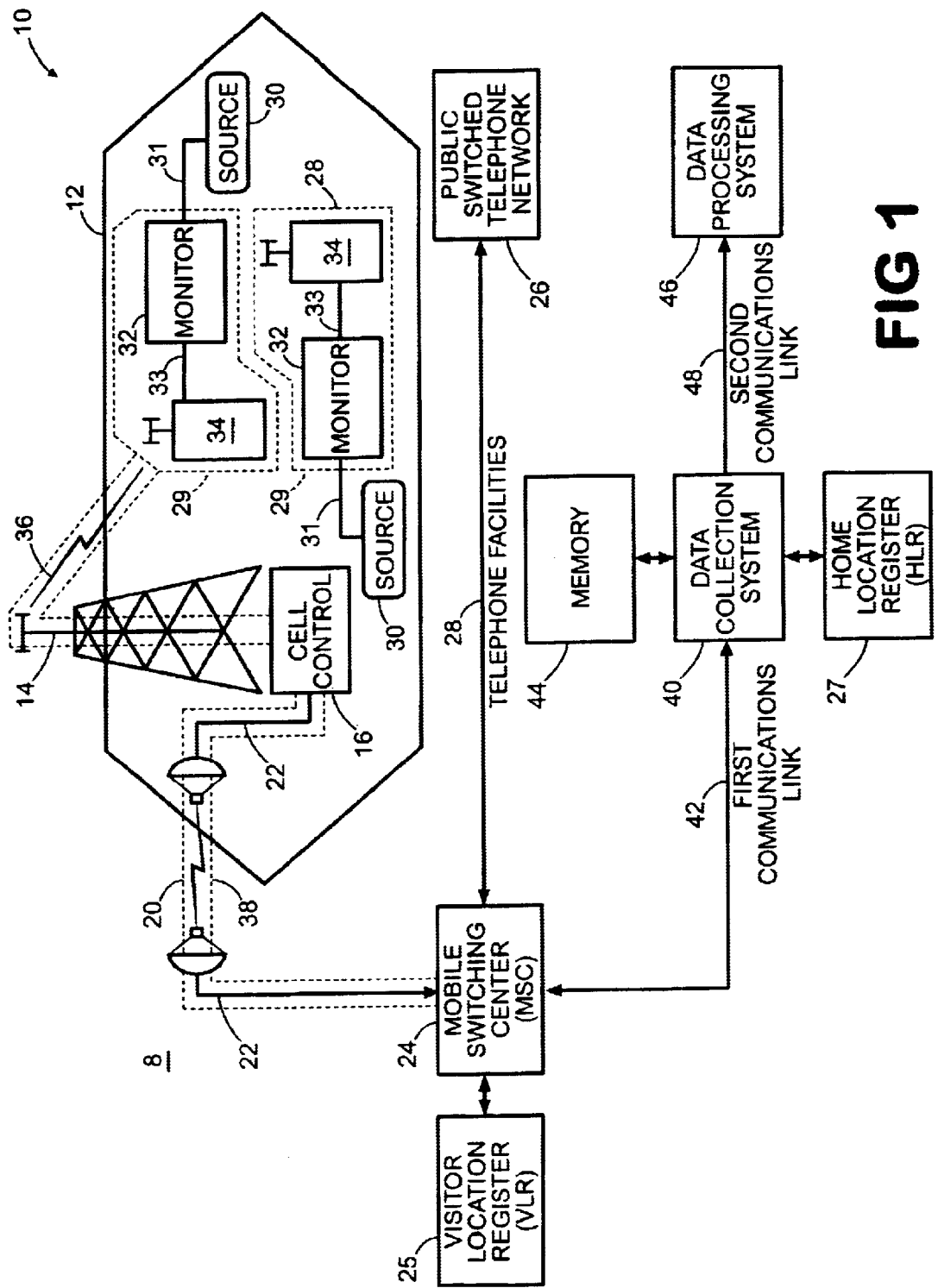
FIG. 1 is a block diagram of a data message system in the environment of a CMR system.
Figure 2:
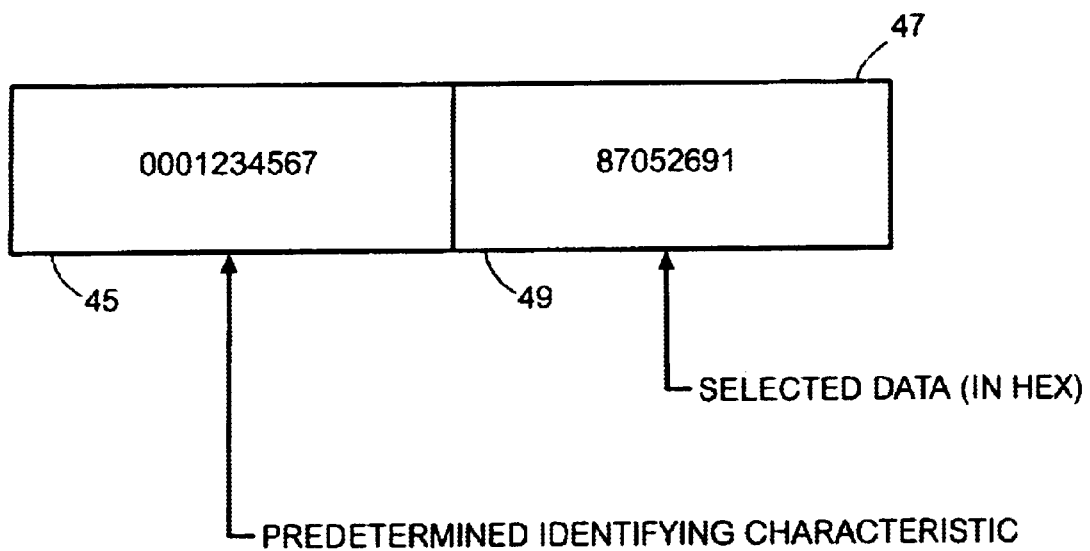
FIG. 2 is a table that shows the format for the data message that is communicated via the data message system.
Figure 3:
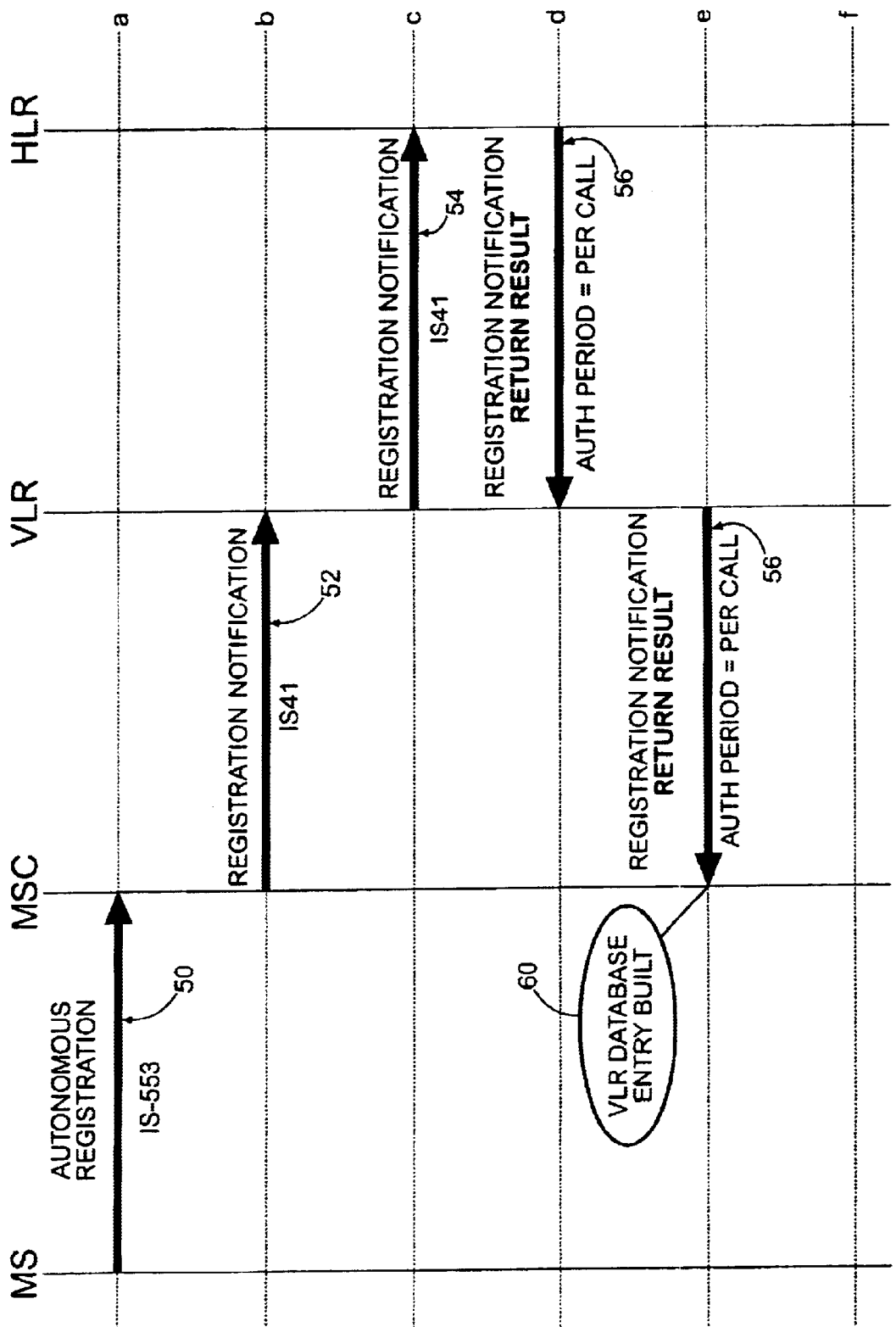
FIG. 3 is a signal flow diagram illustrating the typical sequence of messages communicated by a CMR system in response to the issuance of an Autonomous Registration Signal by a mobile station.
Figure 4:
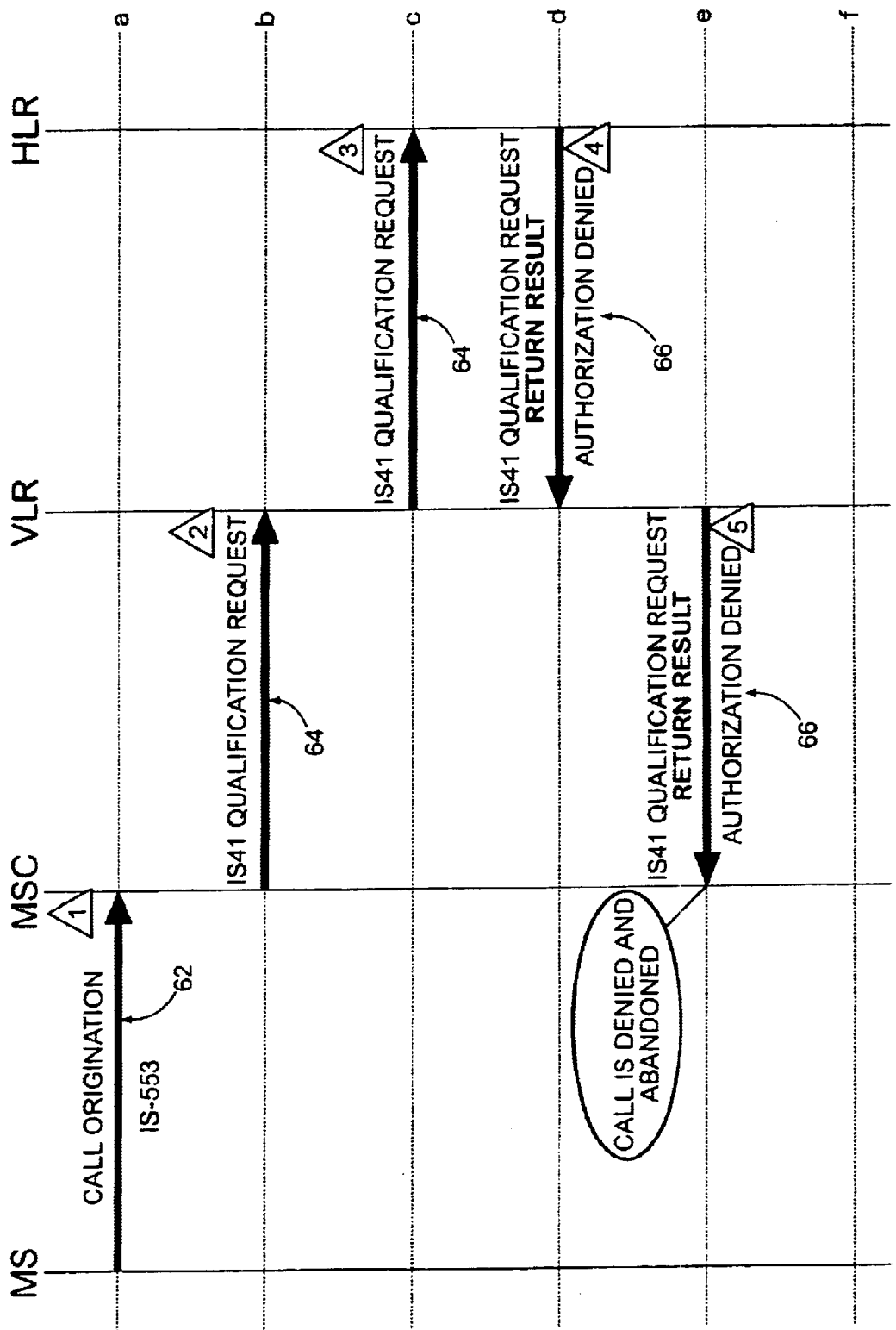
FIG. 4 is a signal flow diagram illustrating the typical sequence of signals communicated by a CMR system in response to the issuance of a Call Origination Signal by a mobile station identified as a cellular source requiring Per Call authorization of all calls originated by that source.
Figure 5:
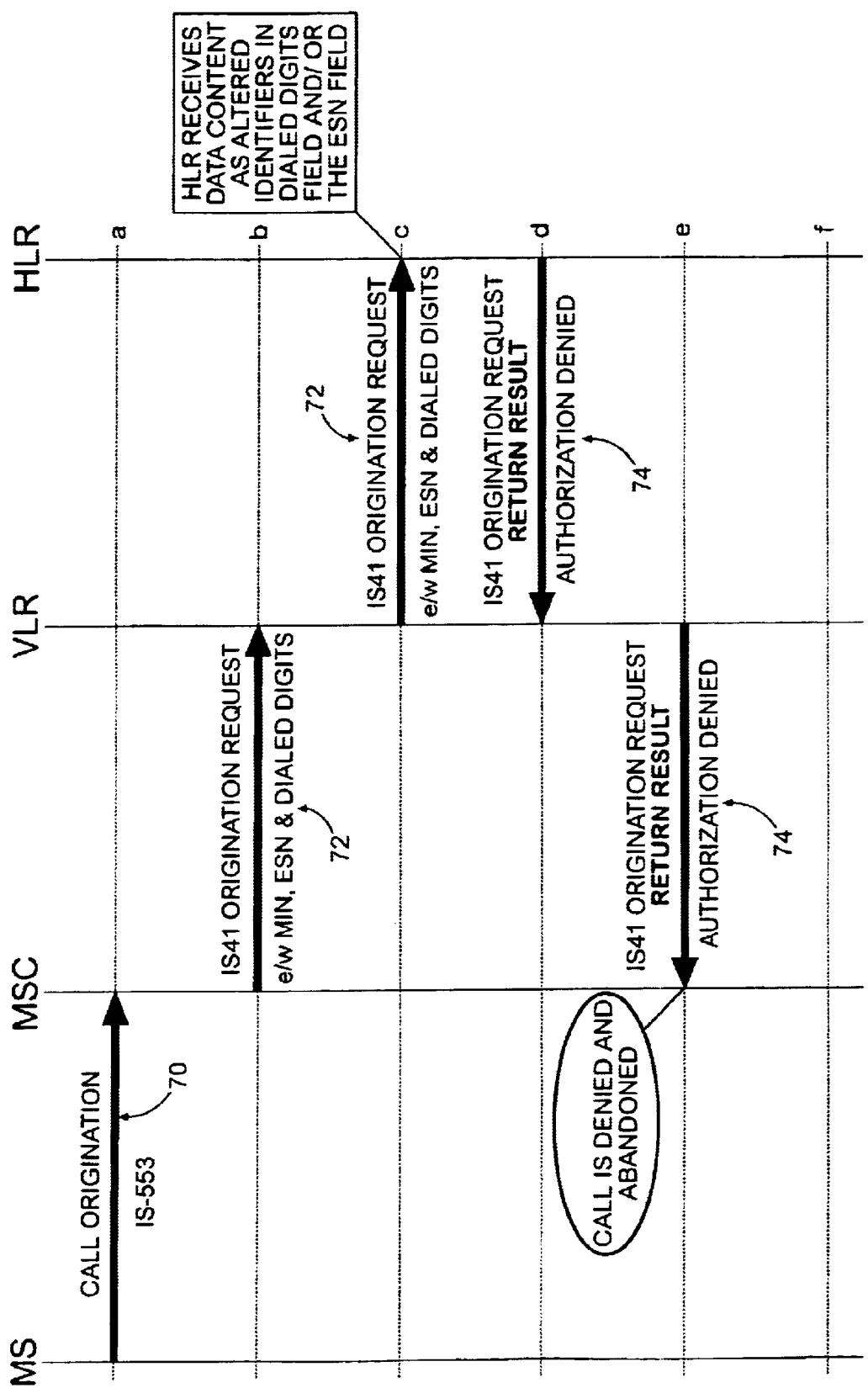
FIG. 5 is a signal flow diagram illustrating a sequence of signals communicated by a CMR system to communicate a data payload within the dialed digits field of a Call Origination Signal and an Origination Request message in accordance with an exemplary embodiment of the present invention.
Figure 6:
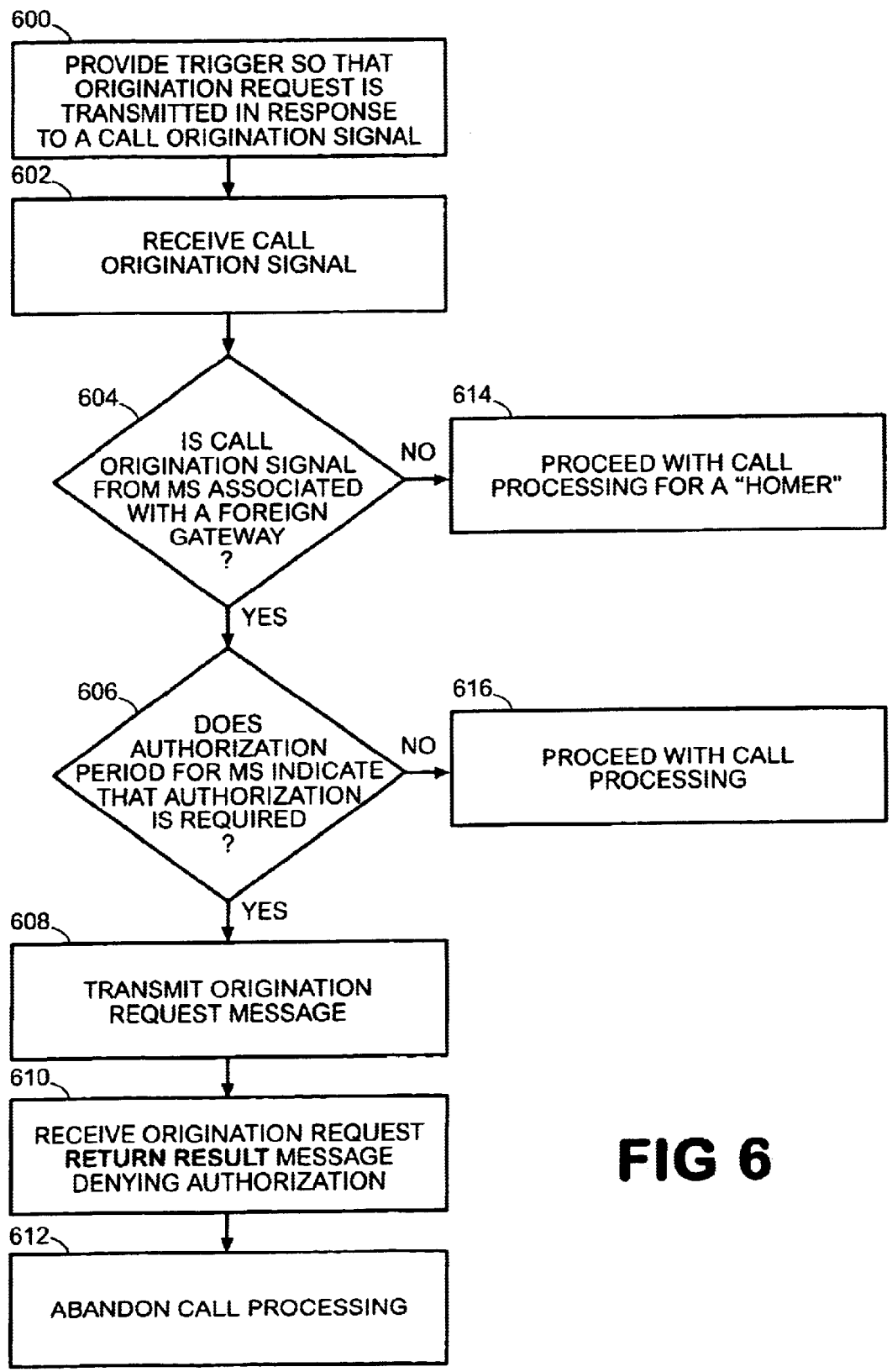
FIG. 6 is a flow diagram illustrating the steps performed by a mobile switching center in accordance with an exemplary embodiment of the present invention.
Figure 7:
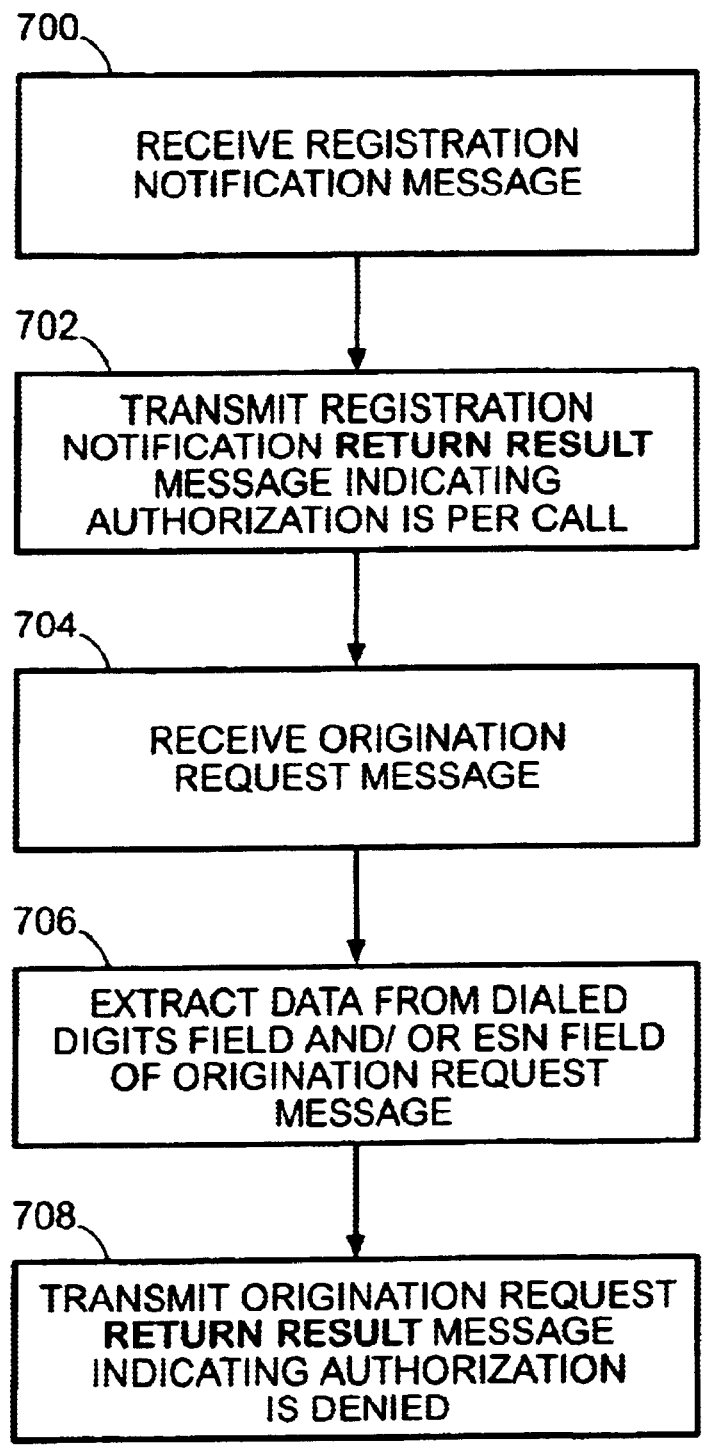
FIG. 7 is a flow diagram illustrating the steps performed by a data collection system in accordance with an exemplary embodiment of the present invention.

FIG. 1 illustrates an exemplary embodiment of a data message system in the operating environment of a CMR system. FIG. 2 is a table that shows the format for the data message that is communicated via the data message system. FIG. 3 illustrates a typical signal sequence for setting the Authorization Period field of a Registration Return Result to per-call authorization, thereby enabling subsequent call originations to cause additional IS41 messages to be sent to the mobile station's "home" HLR prior to any actual call delivery attempt. FIG. 4 illustrates the typical communication of IS41 Qualification Request messages between an MSC and an HLR in response to an IS553 Call Origination Signal; however, setting one or more appropriate call processing triggers enables the MSC to send an IS41 Origination Request message instead of a conventional Qualification Request. FIG. 5 illustrates sending an IS41 Origination Request message via an MSC in response to a Call Origination signal. FIG. 6 illustrates the steps performed by an MSC and FIG. 7 illustrates the steps performed by the HLR in accordance with an exemplary embodiment of the invention.

In FIGS. 3–5, IS41-compatible signal sequences are illustrated to emphasize the communications between certain CMR system devices, including the MSC and the visitor location register (VLR) system. For purposes of the discussion, the MSC typically communicates with the VLR by issuing a query for information maintained by the VLR database and, in turn, the VLR responds by supplying the requested information, if available, to the MSC. Based upon the returned information, the MSC can issue an IS41-compatible message to the HLR associated with the particular mobile station. Although FIGS. 3–5 suggest that the VLR directly generates IS41-compatible messages, those skilled in the art will appreciate that the MSC, operating in tandem with the VLR, is typically responsible for generating those messages. Consequently, signal sequences shown in FIGS. 3–5, as well as the description herein, should be interpreted in this fashion, which is consistent with industry standard practices.

Exemplary Data Message System

Turning now to the drawings, in which like numerals indicate like elements throughout the various figures, FIG. 1 illustrates an exemplary embodiment of a data message system 10 in the operating environment of a CMR system 8. Referring to FIG. 1, the data collection system 10 supports the collection and communication of data to a central data collection site by reporting systems associated with numerous data sources. By operating within the environment of the CMR system 8, which is well adapted for portable or mobile communications, the data message system 10 takes advantage of an existing wide area communications network and avoids the expense of communicating with each remote data site via a dedicated conventional telephone facility or conventional two-way radios. Numerous communications applications are available for the data collection system 10, including communicating data collected from a wide variety of data sources, such as utility meters, community antenna television (CATV) pay-per-view (PPV) terminals, equipment operating at isolated sites, and security alarm systems.

The data message system 10 adapts the existing environment of a CMR system to communicate data from one or more remote sites to a central location. However, to conserve the use of voice channels of the CMR system for conventional telephone conversations, the data collection system 10 uses the cellular network control channel of the CMR system for data communications. This permits conservation of the valuable frequency spectrum dedicated to the voice channels of the typical CMR system.

A typical CMR system includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. A mobile telephone switching office, such as the mobile switching center (MSC) 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24.

It is well known to those skilled in the art that the conventional CMR system comprises at least one mobile telephone switch coupled to an appropriate array of more or less identically equipped cell sites 12. The MSC 24 normally couples telephone conversations involving mobile radiotelephones operating in the cell 12 to the public switched telephone network (PSTN) 26 through telephone facilities 28. The MSC 24 may also be functionally connected to VLR 25. Those skilled in the art will appreciate that VLR 25 may be implemented within or located proximate to MSC 24.

The data collection system 10 includes a set of data reporting devices 29, each comprising at least one monitor 32 for collecting data from remote data sources 30 and a cellular communications device 34 for communicating the collected data via a control channel of the CMR system to the MSC 24. The monitor 32, which is connected to a corresponding remote data source 30 via a signal path 31, obtains and records selected data directed to the operation or performance characteristics of the data source 30. In turn, the cellular communications device 34, which is connected to the corresponding monitor 32 via a signal path 33, prepares a data packet containing the selected data and transmits the packet as a data message. The selected data represents actual data acquired by the monitor 32 in response to monitoring the operation or performance of the data source 30. Alternatively, the selected data can represent predetermined data or a preprogrammed message that is associated with the detection of a certain event by the monitor 32 for the data source 30.

The MSC 24 receives the data message via a cellular network control channel 38 formed by the combination of the data link 22 and a cellular communications link 36 between the broadcast antenna 14 and the cellular communications device 34. This combination of communications links is collectively referred to as the control channel. It is well known that a cellular network control channel for a conventional CMR system comprises two radio channels that are commonly described as a forward control channel (FOCC) and a reverse control channel (RECC). The FOCC is used for communications initiated by the MSC to a radiotelephone unit. In contrast, the RECC is used for communications from the radiotelephone to the MSC 24. The communications operations of the preferred embodiment also use this convention for communications between the MSC 24 and the cellular communications device 34. In particular, the control channel 38 comprises two separate data communications paths, an FOCC for communications initiated by the MSC 24, and an RECC for communications initiated by the cellular communications devices 34 (or mobile radiotelephones operating within the cell). Accordingly, the cellular communications device 34 transmits data messages via the RECC, whereas the MSC 24 transmits command signals via the FOCC.

In this manner, the MSC 24 can receive data messages from each of the cellular communication devices 34 operating within the coverage areas of an array of cells for the CMR system 8. Although the data messages contain selected data rather than the parameters normally contained in an actual radiotelephone control information, the MSC 24 will operate upon the data messages as if they were transmitted by a conventional radiotelephone operating within the cell because the data messages are formatted to appear as a registration signal generated by a radiotelephone unit.

The MSC 24, in response to a data message, can conduct one or more of the following operations: store the data message for processing at a later date, process the selected data supplied by the data message, or forward the data message to a data collection system 40 via a first communications link 42. The data collection system 40, which is connected to a memory storage device 44, collects the selected data by storing the received data messages within the memory storage device 44. Similar to the MSC 24, the data collection system 40 also can process the selected data to obtain further information concerning the operation or performance of the data sources 30. Alternatively, the data collection system 40 sends the data message to a data processing system 46 via a second communications link 48. The data collection system 40 may also be functionally connected to HLR 27. Those skilled in the art will appreciate that HLR 27 may be implemented as part of data collection system 40, or vice versa. The data processing system 46 is typically remotely located from the data collection system 40 and facilitates convenient processing of the selected data at a central site. The second communications link 48 is typically implemented by a conventional telephone facility, a dedicated data link, or by a wireless communications link.

A typical application for the data collection system 10 is to monitor the loads of an electrical load system and to communicate energy consumption data to a central site for processing. The utility industry typically determines the effectiveness of an electrical load management system for a selected control scenario by collecting or monitoring energy consumption data for certain customers during load management activities. In particular, the utility compares the maximum energy consumed by the selected customers for certain collection periods to the maximum energy that would be consumed by those customers in the absence of any load management activities. A utility typically uses a load profile recorder located proximate to each customer's electrical load for recording the customer's power consumption during predetermined time intervals. Upon the conclusion of the collection period, the recorded energy consumption data is then forwarded from each load profile recorder to a central data processing site for data translation and evaluation. It is well known to use a conventional telephone system to send energy consumption data recorded by the load profile recorder to the data processing site.

For this application, the monitor 32 operates as a load profile recorder to obtain the energy consumption data from the data source 30, in this case an electrical load. The cellular communications device 34 thereafter transmits a data message containing the energy consumption data to the MSC 24. The MSC 24 can then forward the data message to the data collection system 40 for processing of the energy consumption data or, in turn, the data collection system 40 sends the data message to the data processing system 46 for processing operations. In this manner, the utility can collect energy consumption data from numerous electrical loads to support the utility's evaluation of the effectiveness and cost benefit of its electrical load management program.

It is also well known to use a system for monitoring and communicating data pertinent to the commercial operation of a reporting system, such as a soft drink vending machine, to a central data collection site via a conventional telephone facility on a nondedicated basis. Such systems permit the monitoring of various occurrences within vending machines, such as inventory changes, service calls, cash receipts, demand for certain products, sold-out conditions, and miscellaneous alarm functions. For this type of application, the monitor 32 monitors the commercial operations of the data source 30, in this case a vending machine, and the cellular communications device 34 transmits a data message containing the operation parameters to the MSC 24. Similar to the utility application, the MSC 24 can then forward the data message to the data collection system 40 for processing of the selected data. Alternatively, the data collection system 40 can respond by sending the data message to the data processing system 46 for processing operations.

It will be recognized that the data collection system 10 is useful for a wide variety of data collection and reporting activities and that the above-described examples are not intended to limit the scope of applications for the present invention.

The data collection system 10 adapts the existing architecture and communications protocols for a conventional CMR system to supply a novel and economical approach to the communication of data collected from numerous remote sites. It will be understood that the communication of data messages between the MSC 24 and the cellular communications device 34 is primarily based upon conventional techniques and known protocols for CMR system communications. Accordingly, prior to describing the detailed operation of the data collection system 10, it will be useful to review the operation of a typical CMR system.

A CMR system is generally characterized by dividing a radio coverage area into smaller coverage areas or "cells" using low power transmitters and coverage-restricted receivers. As will be known to those skilled in the art, the limited coverage area allows the radio channels used in one cell to be reused in another cell. As a mobile radiotelephone within one cell moves across the boundary of the cell and into an adjacent cell, control circuitry associated with the cells detects that the signal strength of the mobile radiotelephone in the just-entered cell is stronger, and communications with the mobile radiotelephone are "handed-off" to the just-entered cell.

A CMR system typically uses a pair of radio frequencies for each radio channel and each cell. Each cell typically includes at least one signaling channel, also referred to as a cellular network control channel or an access channel, and several voice channels. The control channel is selected or dedicated to receive requests for service from mobiles and portables, to page selected mobiles or portables, and to instruct the mobiles or portables to tune to a predetermined voice channel where a conversation may take place. Accordingly, the control channel is normally responsible for receiving and transmitting data to control the communication actions of the mobile and portable radiotelephones.

The control channel normally comprises an FOCC for communications from the MSC to a radiotelephone unit and an RECC for communications from a radiotelephone unit to the MSC. The FOCC supplies a multiplexed data stream of message data words, a busy idle signal, and busy idle bits. The busy idle bits are useful for supplying an indication to monitoring radiotelephones about the current status of the RECC. If the RECC is in use by a radiotelephone unit, then the RECC is considered to be busy and the busy idle bit is set to a binary one value. Alternatively, if the RECC is not in use, then the RECC is considered to be idle and the busy idle bit is set to binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a radiotelephone normally transmits on the control channel during the window of opportunity that is presented by a transition from the busy state to the idle state. In particular, the busy idle bit supplies an instantaneous view of the signaling activity on the control channel, and the conventional radiotelephone is responsive to this instant snapshot of control channel activity.

The data message and radio channel specifications for U.S. cellular radiotelephone systems are set forth in Electronic Industries Association/Telecommunications Industry Association (EIA/TIA) Standard 553, implemented in accordance with 47 C.F.R. §22, in the Report and Orders pertaining to Federal Communications Commission (FCC) Docket No. 79-318. Copies of the EIA/TIA-553 may be obtained from the Engineering Department of the Electronic Industries Association at 2001 Pennsylvania Avenue, N.W., Washington, D.C., USA 20006.

It is known that when a cellular mobile radiotelephone originates a call, it transmits a series of data messages to the serving cell. These messages, commonly referred to as Call Origination, are defined by EIA/TIA-553. These data messages always contain the low order seven digits of the unit's telephone number, known as the Mobile Identification Number (MIN), the unit's Station Class Mark (SCM), which identifies functional characteristics of the unit, and the Called Address, or dialed telephone number. Cellular system operators typically also require additional data words to be transmitted that contain the MIN2, which is the high order three digits or NPA of the cellular unit's telephone number, and the Electronic Serial Number (ESN). The MIN is assigned to a particular radio telephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment. Similarly, the ESN is unique to each mobile cellular radiotelephone unit, and comprises a format that allows differentiation as to manufacturer and, in some cases, the model number, date of manufacture, and the like.

These messages are provided first to the cell, and then through a data link to a mobile telephone switching center, otherwise described as a mobile switching center. The MSC, also known as a "switch," makes voice connections between mobile radiotelephones and other telecommunications networks. At the MSC, a determination is typically made whether the radiotelephone is an authorized user or subscriber by looking up the unit's telephone number, serial number, and other information supplied by the radiotelephone to see if there is an entry in the MSC's database corresponding to that particular telephone. An optional function of an MSC is to validate that the ESN and MIN received as part of a Call Origination message are valid. If the MIN is valid and the radiotelephone is identified as a subscriber within the given cellular system, i.e., a "home" unit, the received ESN is compared to the MSC's database ESN entry to detect fraud. If these checks succeed, the cellular call is then allowed to proceed.

It is also well known that when a mobile radiotelephone first powers up or first enters a CMR system when already powered, the unit can identify itself as actively present within the system. The radiotelephone identifies itself or "registers" through a process known as Autonomous Registration by supplying a data packet similar to that of a Call Origination. The Autonomous Registration signal, also referred to as a registration or identification signal, typically comprises data fields for at least a mobile telephone number, i.e., the MIN, and an ESN. The original design attempt of Autonomous Registration was to improve the efficiency of potential future call deliveries by keeping the MSC informed of the approximate whereabouts of each individual radiotelephone unit, and to reduce paging channel load by lessening the need to page all cells to find a particular cellular unit. When the MSC is thus informed, it can later "page" or attempt to ring the cellular unit only in the cell or area that it was last known to be in. Additional cells would be paged only if the initial page did not locate the particular radiotelephone. Thus, Autonomous Registration is simply a set of messages periodically and autonomously sent from the mobile radiotelephone to the serving cell at an interval specified in data parameters previously received from the cell by the cellular unit.

A subscriber using or attempting to use his or her mobile radiotelephone in a service area outside the home service area is said to be "roaming," and he or she (and the associated mobile radiotelephone unit) is commonly referred to as a "roamer." For example, if a subscriber enters the service area of another CMR system service provider and powers on the radiotelephone, the radiotelephone will subsequently receive a message via the control channel of the particular cell in which the telephone then resides. This message will include a request that the subscriber register for operation in the particular cellular system. In response, both the mobile telephone number and the serial number for the radiotelephone unit are transmitted as identifying information back to the cell site. The cell forwards this information to a mobile switching center, which quickly ascertains whether the radiotelephone unit is a customer of the local cellular service provider or the customer of another cellular system.

If the radiotelephone unit is a customer of another cellular service provider, the mobile switching center will send a message packet to the home system for the particular telephone unit. This message indicates that the particular radio telephone unit has registered in another cellular system and requests information about the validity of the number and account information for the radio telephone unit. The home system responds by transmitting a responsive packet containing the requested information. If valid, the mobile switching center at the foreign cellular system will then add the roamer to its list of registered users and the home cellular system will add the subscriber associated with the radio telephone unit to a list of roamers that are out of the service area and registered in another area.

When this same radiotelephone unit registers with yet another system, the database at the mobile switching center for the home system will observe that the unit has moved again and will update its list of where the roaming unit has most recently registered in a database system. In addition, it will send a message to the first foreign system informing it that the roaming unit has now moved on and registered in another system, and that the first foreign system should delete the particular unit from its list of registered roamers. In this manner, the databases at the various mobile switching centers are not cluttered with data identifying previously registered roamers as valid accounts to whom service should be provided, when these roamers may have long since left the area of service.

In view of the foregoing general information about cellular system operations, and referring again to FIG. 1, in response to the transmission of a data message by a cellular communications device 34, the MSC 24 typically makes a determination whether the cellular communications device 34 that transmitted the data message is an authorized user or subscriber of the services offered by the cellular system 8 or another system. The data message preferably includes certain information that identifies the cellular communications device 34 as a radiotelephone that normally operates within a certain remote or foreign cellular system. Based upon this information, the MSC 24 decides that the cellular communications device 34 is a roamer because it actually subscribes to the cellular service offered by another cellular system, which, in this case, is the remote cellular system. In particular, the MSC 24 maintains a list or database that identifies the certain information in the data message as belonging to a particular cellular system and, by checking this database, determines whether the cellular communications device 34 is a subscriber or a roamer. Thus, it will be understood that the MSC 24 interprets the data message as a transmission from a roaming mobile radiotelephone operating within the CMR system 8.

The remote cellular system identified by the data message is not an actual operating cellular system for supporting telephone conversations, but rather is dedicated to data collection applications and is represented by the data collection system 40. In recognition that the cellular communications device 34 is actually associated with the remote cellular system, the MSC 24 forwards the data message to the data collection system 40 via the first communications link 42. The data collection system 40 responds by sending to the MSC 24 a message which confirms that the roamer associated with the data message is a valid or authorized user of the remote cellular system. The cellular communications device 34 is thereafter added as a registered radiotelephone to a database of registered roamers at the MSC 24.

The data collection system 40 has now received the data message containing selected data collected from the remote data source 30 and, unlike the MSC 24, recognizes that the data message actually contains the desired data collected from a remote data source 30. Accordingly, the data collection system 40 transmits a message to the MSC 24 that instructs the MSC to delete the cellular communication device 34 from its list of registered roamers. It will be understood that the MSC 24 would normally receive this type of message when a roaming radiotelephone has moved to another cellular system and subsequently registered for operation on that other system. Thus, the database of the MSC 24 is no longer required to maintain the registration information concerning the cellular communications device 34 after transferring the data message to the data collection system 40.

Alternatively, the MSC 24 clears its database of such registration information upon the expiration of a certain time interval. The data collection system 40 can respond to the data message by transmitting a message which confirms that the roamer is a valid user and further instructs the MSC 24 to delete the registration entry upon the expiration of the certain time interval. As a separate option, the MSC 24 can automatically delete a registration entry from the MSC database upon expiration of a certain time period without any instruction from the data collection system 40. In this manner, the data collection system 40 is not required to send yet another message to the MSC 24 after the data collection system 40 confirms that the cellular communications device 34 represents a valid user.

The MSC 24 and the data collection system 40 are preferably compatible with the EIA/TIA Interim Standard 41 (IS-41 standard). The IS-41 standard defines a communications protocol for communications between two cellular systems. The IS-41 standard allows cellular calls to be handed-off between dissimilar cellular systems, not unlike the way that calls are handed-off between cells of a single CMR system. In addition, the IS-41 standard permits call deliveries and a communications exchange for verifying whether a cellular caller is a valid cellular service subscriber. In this manner, the MSC 24 hands-off or forwards the data message to the data collection system 40 via the first communications link 42, which is preferably implemented as an IS-41-compatible network. In response, the data collection system sends a user validation message via the link 42 to confirm that the source of the data message, specifically a cellular communications device 34, is a valid cellular source.

In particular, the data collection system 40 recognizes that the received data message contains selected data which has been transmitted by a cellular communications device 34. Accordingly, the data collection system 40 processes the received data message and compares the predetermined identifying characteristic in its data message to a list of such characteristics in its database. This database preferably contains an entry of the predetermined identifying characteristic for each of the known cellular communications devices 34 and corresponding data that identifies the associated device as a valid cellular source. Upon obtaining a positive match, the data collection system 40 preferably responds to the received data message by sending to the MSC 24 the verification message. It will be appreciated that the data collection system 40 also can forward to the MSC 24 a message confirming the absence of a valid entry for the cellular communications device 34 in response to a negative match.

This validation message can also include a profile of communications services that are authorized for use by the particular cellular source. For example, this user profile typically defines the operations limitations for the cellular source, including access to long distance services, the capability for the source to only originate (and not receive) calls via the cellular system, etc. For the preferred embodiment, the user profile information can contain an instruction that commands the MSC 24 to delete from its database the registration entry for the particular cellular communications device after the expiration of a certain time period. This allows the MSC 24 to clear from its database entries for cellular communications devices 34 that have communicated their data message via the cellular system 8 by registering with the MSC 24 because such devices no longer require the continued communications support of the MSC 24.

The data collection system 40 can store the selected data supplied by the received data message within the memory storage device 44, can process the selected data and store the resultant data, or can forward the selected data to the data processing system 46 for processing. Prior to sending the selected data to the data processing system 46, the data collection system 40 first converts the data message to an acceptable communications protocol for conveying the data message to the data processing system 46. This step is necessary prior to communication with the data processing system 46 because, unlike the MSC 24 and the data collection system 40, neither the data processing system 46 nor the second communications link 48 are compatible with the IS-41 standard.

Although for the illustrative embodiment the MSC 24 is programmed to treat the cellular communications devices 34 as roamers associated with a foreign cellular system, it will be appreciated that the database of the MSC 24 also can be programmed to contain entries for the predetermined identifying characteristics of those cellular communications devices 34 operating within the cells of the cellular system 8. Upon receiving a data message via the control channel 38 from such a device 34, an MSC 24 containing such database entries will identify the transmitting cellular communications device 34 as a "home" unit rather than as a roamer because the MSC database contains an entry that corresponds to the predetermined identifying characteristic supplied by the message. Thus, the MSC 24 registers the transmitting cellular communications device 34 as a home unit of the cellular system 8. This avoids the additional requirement of contacting a foreign cellular system, such as the data collection system 40, to inquire whether this cellular source is a valid user or subscriber of cellular services.

However, to initiate the necessary transfer of the information in the data message to the data collection system 40, the MSC 24 for this embodiment is adapted to recognize that data messages should still be forwarded to the data collection system 40. Specifically, based upon a portion of the predetermined identifying characteristic that is uniquely associated with the data collection system 40, the MSC 24 locates an entry in its database that commands the switch to send all messages containing such a characteristic to the data collection system 40. Accordingly, the MSC 24 thereafter forwards the data message via the first communications link 42 to the data collection system 40.

The data collection system 40 can be implemented by a computer. One embodiment for the data collection system 40 is the computer of a service control point. Certain manufacturers of switches, such as the MSC 24, also offer devices for implementing communications with the data collection system 40, including the Motorola EMX switch and other vendor proprietary switches. Switch manufacturers include: AT&T Network Systems, Whippany, N.J.; Ericsson Radio Systems, Richardson, Tex.; Hughes Network Systems, Germantown, Md.; and Motorola, Schaumburg, Ill.

The cellular system 8 is preferably implemented as an AMPS or a DAMPS cellular system. However, it will be appreciated that the cellular system 8 also can be compatible with alternative cellular systems implementing a control channel for mobile to cell communications, including: DCS 1800, GSM, IS 95-CDMA, JTACS, TACS, ETACS, RC 2000, NMT 450, ESMR, CT-2, WACS, NMT 900, or other similar wireless systems.

It will be appreciated that the CMR system 8 includes an array of cells, such as the cell 12, and that a set of reporting systems 29, each formed by the monitor 32 and the cellular communications device 34, are typically located in a cell. For each data source 30 within the cell 12, the monitor 32 and the cellular communication device 34 are preferably located proximate to the data source 30 to minimize the lengths of the signal paths 31 and 33. To facilitate economical installation of the reporting device, the monitor 32 and the cellular communication device 34 can be combined within the same housing and this housing can be installed either adjacent to or as an integral part of the data source 30. For an installation proximate to the data source 30, the signal path 31 and the signal path 33 preferably form hard-wired connections between the connected devices. Nevertheless, it will be appreciated that the signal paths 31 and 33 also can be implemented as either infrared communications links or wireless communications links.

It will be understood that a single cellular communications device 34 can be connected to multiple monitors 32 to permit the transmission of selected data collected from associated data sources 30 located at a central site. For example, a single cellular communications device 34 can be mounted at a central location within or along an office building and multiple monitors 32 can be distributed throughout the building to permit the acquisition of data from the associated data sources 30.

The data collection system 40 can be located proximate to or as an integral part of the MSC 24, in which case the first communication link 42 preferably forms a hard-wired connection between the devices. However, the data collection system 40 also can be positioned at a remote site. For this remote installation, the first communications link 42 can be implemented as a wireless communications system, such as a microwave system, or as a dedicated data line, such as a conventional telephone facility. For the convenience of the party that is sponsoring the collection of a particular type of data, the data processing system 46 is typically located at another remote site that is typically proximate to the sponsoring party.

Exemplary Data Message

FIG. 2 is a table that shows the format for the data message that is communicated by the data message system 10. Referring now to FIGS. 1 and 2, a data record 47 for the data message contains both a data field 49 for the selected data acquired from the remote data source 30 and a data field 45 for a predetermined identifying characteristic which uniquely identifies the cellular communications device 34 that initiates the transmission of the data message. To take advantage of the existing architecture of a CMR system 8, the format for the data message preferably is identical to the message format (or data record) for an identification signal, such as an Autonomous Registration or Call Origination Signal, which is transmitted by a cellular radiotelephone when it first identifies itself to a CMR system, such as the CMR system 8.

By using the data message format associated with a registration signal, the cellular communications device 34 "registers" with the MSC 24 by sending a data message that appears to contain a valid mobile telephone number, an ESN, and a dialed digits field. Although it is not intended for the cellular communications device 34 to place a conventional voiced-based cellular telephone call, the cellular communications device 34 nevertheless registers for operation with the MSC 24, thereby enabling the communication of the selected data from the field.

As shown in the data record 47 in FIG. 2, the standard message format for a registration signal has been adapted by the data message to permit the identification of the particular transmitting cellular communications device 34 and the communication of the selected data. In particular, the data field 45 for the predetermined identifying characteristic corresponds to at least a portion of a mobile telephone number or MIN assigned to the cellular communications device 34. Thus, the predetermined identifying characteristic is substituted within the data field normally reserved for the MIN in an identification signal. This predetermined identifying characteristic can belong to a set of unassigned mobile telephone numbers. Alternatively, the predetermined identifying characteristic assigned to each cellular communications device 34 can be a conventional telephone number or a set of 10 digits. The predetermined identifying characteristic permits the identification of the source of the data by uniquely identifying the cellular communications device 34 associated with the remote data source 30. The predetermined identifying characteristic also supplies information used by the MSC 24 to recognize that the data message containing this predetermined identifying characteristic is associated with the data collection system 40.

The data field 49 corresponds to the data content of the dialed digits field of the Call Origination signal received by the MSC. Additionally, the data field 49 in the data message for remote data may also correspond to the location within the data record of an identification signal for the ESN. Those skilled in the art will appreciate that the ESN is 32 bits long and includes 8 bits for a manufacturer code. For cellular systems that do not review or screen ESN's based upon the manufacturer code segment, it is possible to manipulate the data field normally filled by an ESN to supply a data message having a data field 47 containing 32 bits of selected data. However, if the cellular system uses the manufacturer code segment of the ESN, the selected data within the data field 47 comprises a length defined by the remaining 24 bits of the ESN. For most applications, it will not be necessary to manipulate the manufacturer's code segment of the ESN because a data message having 24 bits of selected data (and, as required, 8 bits of the manufacturer code segment for a conventional ESN) should be sufficient to supply relevant data.

Although adapting certain predefined data fields of a conventional registration signal is an exemplary method for forwarding selected data in a data message to the MSC 24, another message protocol also can be used to send desired information from the cellular communications device 34 to the MSC 34 via the control channel 38. Specifically, EIA/TIA-553 defines an extended protocol message that can be adapted to contain the above-described data fields for the predetermined identifying characteristic and the selected data. For this type of message transfer, the data message is formatted to represent an extended protocol message in accordance with EIA/TIA-553. This extended protocol extends the signaling capabilities of the interface between the MSC and mobile cellular devices to allow new features and operational capabilities for present and future cellular systems.

As defined by EIA/TIA-533, the extended protocol message for the RECC includes a message header and at least one message data word (up to N message data words). The message header consists of two words, a header word A and a header word B. The header word A includes a format having the following fields: field F1 (2 bits set to the binary value 11), which indicates the start of the header; a reserved field RSVD (2 bits set to the binary value 00); a message class field T (1 bit set to the binary value 1); an S field (1 bit set to the binary value 0), which indicates whether the cellular device should send its serial number when it accesses the system; an E field (1 bit set to the binary value 1), which indicates whether the cellular device should send MIN 1 and MIN 2; an extended protocol indicator ER field (1 bit); an SCM field (4 bits); an MIN field (24 bits); and a cyclic redundancy code P (12 bits). The header word B includes the following fields: field F2 (2 bits set to the binary value 10), which indicates the start of the second header word; a reserved field RSVD (2 bits set to the binary value 00); a message length indicator MSL field (5 bits); a message type indicator MST field (8 bits); an LT field (1 bit), which indicates whether the next access by the cellular device should be the last access try; an extended protocol capability indicator EP field (1 bit set to a binary value 1); a reserved field RSVD (7 bits set to a binary value 0 . . . 0); an MIN 2 field (10 bits); and a cyclic redundancy code P (12 bits). The message data word includes the following fields: field F3 (2 bits set to the binary value 01), which designates the first to last N–1 message data words, or field F4 (2 bits set to the binary value 00), which designates the last message data word; the message data (34 bits); and a cyclic redundancy code P (12 bits).

A mobile switching center normally is programmed or otherwise adapted to conduct a predetermined operation upon an extended protocol message or to implement a certain action in response to the reception of a extended protocol message. To take advantage of this type of message protocol, the MSC 24 is preferably programmed to forward to the data collection system 40 each data message that is formatted as an extended protocol message. This communication of the extended protocol message does not require the MSC 24 or the data collection system 40 to be implemented as an IS41-compatible communications system. Thus, the first communications link 42 for this embodiment can be implemented as a dedicated data link or a wireless communications link rather than as an IS-41-compatible communications network.

Expanding the Data Payload of a Data Message

An alternative exemplary method of carrying data via a cellular network control channel will now be described. This alternative exemplary method does not require an identifying characteristic to be transmitted with the data and therefore advantageously increases the available data payload. Turning now to FIG. 3, at time "a", a mobile station issues an Autonomous Registration signal 50 via the cellular network control channel for processing by the MSC serving the cell in which the mobile station is operational. In response to the Autonomous Registration signal, the MSC generates an IS41-compatible Registration Notification message 52 at time "b" for processing by the VLR. Those skilled in the art will appreciate that the VLR is typically positioned at, within, or proximate to the MSC. The MSC generates the Registration Notification message based upon an examination of the mobile identification number (MIN) of the Autonomous Registration signal and a determination that this MIN represents a mobile station that is a subscriber of cellular services associated with a foreign or remote HLR. This determination causes the MSC to transmit the Registration Notification message to the VLR to inquire whether the VLR maintains prior knowledge of this "visiting" or roaming mobile station. For purposes of the communication flow shown in FIG. 3, the VLR does not at present maintain any information regarding the visiting mobile station. Consequently, the MSC/VLR forwards the Registration Notification message 54 at time "c" to the distant gateway or "home" HLR associated with that mobile station.

Those skilled in the art will appreciate that the Registration Notification message can be used to report the location of a mobile station. In addition, this Registration Notification message can be used to validate the mobile station or to both validate the mobile station and obtain its profile information. Table 1 illustrates the parameters of a representative IS41 Registration Notification message.

TABLE 1

Registration Notification INVOKE Parameters

| Field | Value |
|---|---|
| Identifier | SET (UNIVERSAL 17) |
| Length | Variable octets |
| Contents | |
| Electronic Serial Number | |
| Mobile Identification Number | |
| MSCID (Serving MSC) | |
| Qualification Information Code | |
| System My Type Code (Serving MSC or VLR) | |
| Availability Type | |
| Border Cell Access | |
| Control Channel Data | |
| Extended MSCID (VLR) | |
| Location Area ID | |
| PC_SSN (Serving MSC or VLR) | |
| Received Signal Quality | |
| Report Type | |
| Sender Identification Number | |
| SMS_Address | |
| SMS_Message Waiting Indicator | |
| System Access Data | |
| System Access Type | |
| System Capabilities | |
| Terminal Type | |
| Transaction Capability | |

At time "d", the HLR for the mobile station responds to the Registration Notification message 54 by issuing an Registration Notification RETURN RESULT 56. This Registration Notification RETURN RESULT includes an Authorization Period parameter that is useful for confirming authorization of a mobile station and specifying the authorization period. For example, if the authorization period specified by this parameter has elapsed, the VLR must obtain authorization from the HLR associated with that mobile station before providing further service to that mobile station (except for Call Delivery service). For the illustrative embodiment, the Authorization Period is set to a value of "1" to specify Per Call authorization. When the Authorization Period parameter is set to the Per Call value, each call originated by the corresponding mobile station must be authorized by the mobile station's associates' HLR. Table 2 provides a listing of the parameters of the IS41 Registration Notification RETURN RESULT. Table 3 provides a listing of the format characteristics for the Authorization Period parameter of the IS41 Registration Notification RETURN RESULT. Table 4 provides a listing of the possible values for the Authorization Period value, as defined by IS41.

TABLE 2

Registration Notification RETURN RESULT Parameters

| Field | Value |
|---|---|
| Identifier | SET (UNIVERSAL 17) |
| Length | Variable octets |
| Contents | |
| System My Type Code (VLR or HLR) | |
| Authorization Denied | |
| Authorization Period | |
| Control Channel Data | |
| Denied Authorization Period | |
| Digits (Carrier) | |
| Digits (Destination) | |
| MSCID (HLR) | |
| Profile Macro | |
| Received Signal Quality | |
| Sender Identification Number | |
| SMS_Message Waiting Indicator | |
| System Access Data | |

TABLE 3

Authorization Period Parameter

| Field | Value |
|---|---|
| Identifier | Authorization Period IMPLICIT OCTET STRING |
| Length | 2 octets |
| Contents | |

| H | G | F | E | D | C | B | A | |
|---|---|---|---|---|---|---|---|---|
| E | G | F | E | D Period Value | C | B | A | octet 1 2 |

TABLE 4

Authorization Period Value

| Bits | H | G | F | E | D | C | B | A | Value | Meaning |
|---|---|---|---|---|---|---|---|---|---|---|
| | | | | Period (octet 1) | | | | | | |
| | 0 | 0 | 0 | 0 | 0 | 0 | 0 | 0 | 0 | Not used |
| | 0 | 0 | 0 | 0 | 0 | 0 | 0 | 1 | 1 | Per Call |
| | 0 | 0 | 0 | 0 | 0 | 0 | 1 | 0 | 2 | Hours |
| | 0 | 0 | 0 | 0 | 0 | 0 | 1 | 1 | 3 | Days |
| | 0 | 0 | 0 | 0 | 0 | 1 | 0 | 0 | 4 | Weeks |
| | 0 | 0 | 0 | 0 | 0 | 1 | 0 | 1 | 5 | Per Agreement |
| | 0 | 0 | 0 | 0 | 0 | 1 | 1 | 0 | 6 | Indefinite (i.e., authorized until cancelled or registered). |
| | 0 | 0 | 0 | 0 | 0 | 1 | 1 | 1 | 7 | Number of calls. |
| | 0 | 0 | 0 | 0 | 1 | 0 | 0 | 0 | 8 | Reserved. Treat the |

TABLE 4-continued

Authorization Period Value

| Bits | H | G | F | E | D | C | B | A | Value | Meaning |
|---|---|---|---|---|---|---|---|---|---|---|
| | | | * | * | * | * | | | through | same as value 1, |
| | 1 | 1 | 0 | 1 | 1 | 1 | 1 | 1 | 223 | Per Call. |
| | 1 | 1 | 1 | 0 | 0 | 0 | 0 | 0 | 224 | Reserved for IS41 |
| | | | * | * | * | * | | | through | protocol extension. |
| | 1 | 1 | 1 | 1 | 1 | 1 | 1 | 1 | 225 | If unknown, treat the same as value 1, Per Call. |

Value (octet 2)

| | | | | | | | | | | |
|---|---|---|---|---|---|---|---|---|---|---|
| | 0 | 0 | 0 | 0 | 0 | 0 | 0 | 0 | 0 | Number of hours, days, |
| | | | * | * | * | * | | | through | weeks, or number of |
| | 1 | 1 | 1 | 1 | 1 | 1 | 1 | 1 | 255 | calls (as per Period). If Period indicates anything other than hours, days, or weeks, the Value is set to zero on sending and ignored on receipt. |

At time "e", the VLR responds to the Registration Notification RETURN RESULT 56 by forwarding that message to the MSC. An entry is also constructed within the VLR database 60 to document that the Authorization Period for the specified mobile station is set to a Per Call authorization status. In this manner, future calls originated by this mobile station will result in the initiation of the authorization process by the MSC and the VLR. By setting the Authorization Period field of the Registration Notification RETURN RESULT 56 to Per Call status, subsequent call origination attempts by the specified mobile station will cause additional IS41 messages to be sent to the home HLR for that mobile station prior to any actual call delivery attempt. Those skilled in the art will appreciate that the authorization process described above also can be initiated by other events, including setting the Authorization Period value to the value of 5 for a per agreement authorization or to a value of 7 for a number of calls.

A representative signal sequence for the conventional authorization process is illustrated in FIG. 4. Turning now to FIG. 4, a mobile station issues a Call Origination signal 62 at time "a" for processing by the MSC. Because the Per Call authorization flag is set at the MSC, as described above with respect to FIG. 4, the switch issues an IS41 Qualification Request message 64 at time "b" to the VLR. This Qualification Request message 64 serves as an inquiry to determine whether the identified mobile station is authorized to complete a call via the CMR system. The MSC/VLR passes the Qualification Request message at time "c" to the "home" HLR associated with the mobile station. For this representative example, the authorization required to complete a call originated by the mobile station is denied by the HLR. As a result, the HLR issues at time "d" a Qualification Request RETURN RESULT 66 with the Authorization Denied parameter set to deny authorization to complete the call by the mobile station. In response, the VLR at time "e" passes the Qualification Request RETURN RESULT 66 to the MSC which, in turn, denies completion of that call by the mobile station. Those skilled in the art will appreciate that the Qualification Request RETURN RESULT can include a similar parameter for authorization acceptance to support the authorization of a call by the mobile station.

It will be understood that FIG. 4 illustrates the conventional response to a Call Origination signal at the MSC when the database maintained by the MSC and/or VLR indicates that Per Call authorization is required for that particular mobile station. However, by setting appropriate call processing trigger(s), an MSC is also capable of sending an IS41 Origination Request message in place of the Qualification Request message. The Origination Request message is typically used to request call origination treatment on behalf of a registered mobile station. Significantly, the Origination Request message contains a dialed digits field representing the dialed digits corresponding to the party called by the mobile station.

Table 5 presents a listing of the conventional parameters for the IS41 Origination Request message. Table 6 provides a listing of the encoded information maintained within the dialed digits parameter or field of this IS41 Origination Request message. For purposes of the present invention, the dialed digits field of the Origination Request message (as well as the Call Origination signal) can be used for data content rather than for the dialed digits of a telephone number for a called party. The entire dialed digits field can be used for data content, up to 32 digits.

TABLE 5

Origination Request INVOKE Parameters

| Field | Value |
|---|---|
| Identifier | SET (UNIVERSAL 17) |
| Length | Variable octets |
| Contents | |
| Billing ID (originating) | |
| Digits (Dialed) | |
| Electronic Serial Number | |
| Mobile Identification Number | |
| MSCID (Originating MSC) | |
| Origination Triggers | |
| Transaction Capability | |
| Calling Party Number Digits 1 | |
| Calling Party Number Digits 2 | |
| Calling Party Subaddress | |
| Mobile Directory Number | |
| MSC Identification Number | |

TABLE 5-continued

Origination Request INVOKE Parameters

One Time Feature Indicator
PC_SSN (Originating MSC)
Sender Identification Number

TABLE 6

Digits Parameter for BCD Digits

| Field | Value |
|---|---|
| Identifier | Digits IMPLICIT Digits Type |
| Length | Variable octets |
| Contents | |

| H | G | F | E | D | C | B | A | octet |
|---|---|---|---|---|---|---|---|---|
| | | Type of Digits | | | | | | 1 |
| | | Nature of Number | | | | | | 2 |
| | Numbering Plan | | | | Encoding | | | 3 |
| | | Number of Digits | | | | | | 4 |
| | 2nd BCD Digit | | | | 1st BCD Digit | | | 5 |
| | 4th BCD Digit | | | | 3rd BCD Digit | | | 6 |
| *** | | | | | *** | | | *** |
| | nth BCD Digit | | | | n-1st BCD Digit | | | m |

Turning now to FIG. 5, one or more appropriate call processing trigger(s) have been set at the MSC to enable the switch to send an IS41 Origination Request message rather than a Qualification Request message in response to a Call Origination signal from a particular mobile station. This trigger event for replacing the conventional Qualification Request message with an Origination Request message can be set at the switch prior to receipt of the Call Origination signal transmitted by the mobile station. Upon setting the appropriate call processing trigger(s) at the MSC, subsequent Call Origination signals received at the switch will prompt the issuance of an Origination Request message rather than the conventional Qualification Request message. The replacement of the Qualification Request message with the Origination Request message is significant because the format of the Origination Request message includes a field for dialed digits, which can be used by the present invention as a place holder for data content transmitted by the mobile station for forwarding to a data collection system. FIG. 5 illustrates an exemplary exchange of cellular signals by conventional components of a CMR system to complete this inventive transportation of expanded data payload from a mobile station to a data collection system represented by an HLR associated with that mobile station.

At time "a", a mobile station issues a Call Origination signal 70 via the cellular network overhead control channel to the MSC servicing the cell in which the mobile station is located. The mobile station represents a cellular mobile radiotelephone that has the capability of inserting data content within the dialed digits field of the conventional Call Origination signal. In other words, the mobile station replaces the telephone number for a called party with data content for transmission to a data collection system via the CMR system. The mobile station is typically associated with a monitoring device for acquiring data from a remote data source. The monitor can acquire desired data from a remote data source and provide that collected data to the mobile station for insertion within the dialed digits field of the Call Origination signal.

Although the term "mobile station" is used throughout the specification and referred to a cellular mobile radiotelephone, those skilled in the art will appreciate that this communications device can be fixed or mobile. Similarly, the monitor and the remote data source can be positioned at a fixed data collection site or can be associated with a mobile data collection application. Typical data acquisition and communication applications include security alarm, vehicle or cargo location, and meter monitoring applications.

In response to receiving the Call Origination signal, the MSC determines that this mobile station is associated with a "foreign" gateway and issues an Origination Request message 72 to the VLR at time "b". As discussed above, the MSC issues a Origination Request message rather than a Qualification Request message because of the prior setting of one or more appropriate call processing trigger(s) at the switch. Significantly, the dialed digits field of the Origination Request message comprises data content from the dialed digits field of the Call Origination signal received by the MSC. In addition, the Origination Request message also can comprise the data content taken from the MIN and ESN field of the Call Origination signal. Consequently, if the mobile station has inserted data content within the ESN field of the Call Origination Signal, then this data content can be placed by the MSC within the ESN field of the Origination Request message. Although the typical Origination Request message comprises a mobile station identifier within the MIN field and data content within both the ESN and the dialed digits field, it will be appreciated that alternative Origination Request messages can comprise an identifier within the MIN field and data content within either the ESN or the dialed digits field. It is preferable, however, to insert data content within the dialed digits field because this particular field comprises up to 32 digits of encoded information, thereby providing the opportunity to transmit expanded set of data via the CMR system.

At time "c", the MSC/VLR forwards the Origination Request message 72 to the distant gateway or HLR associated with the identified mobile station. In this manner, the HLR can receive data content -within the dialed digits field and/or the ESN field. The HLR represents a data collection system for collecting the data parsed from the dialed digits field and/or the ESN field. The HLR also can process the data content obtained from the Origination Request message. Alternatively, the HLR can forward this data content to another data processing site via a CMR communications link or another type of communications link, such as the public switched telephone network (PSTN) or a wireless communications link.

Because the Origination Request message is intended for data communications rather than origination of a telephone call, the HLR preferably denies authorization in response to the Origination Request message. Consequently, the HLR issues at time "d" an Origination Request RETURN RESULT 74 with the Authorization Denied parameter. In response, the VLR forwards the Origination Request RETURN RESULT message 74 at time "e". The MSC responds by denying completion of the call origination and abandoning the processing of that call. Table 7 provides a listing of the characteristics of the IS41 Origination Request RETURN RESULT message.

TABLE 7

Origination Request RETURN RESULT Parameters

| Field | Value |
| --- | --- |
| Identifier | SET (UNIVERSAL 17) |
| Length | variable octets |
| Contents | |
| Access Denied Reason | |
| Action Code | |
| Announcement List | |
| Calling Party Number String 1 | |
| Calling Party Number String 2 | |
| Calling Party Subaddress | |
| Carrier Digits | |
| Digits (Dialed) | |
| DMH_Account Code Digits | |
| DMH_Alternate Billing Digits | |
| DMH_Billing Digits | |
| DMH_Redirection Indicator | |
| Group Information | |
| Mobile Directory Number | |
| No Answer Time | |
| One Time Feature Indicator | |
| Pilot Number | |
| Redirecting Number Digits | |
| Redirecting Number String | |
| Redirecting Subaddresses | |
| Routing Digits | |
| Termination List | |
| Termination Triggers | |

Advantageously, the entire portion of the dialed digits field can be used for the placement of useful data content acquired from a remote data source. In contrast to the prior art, there is no requirement to place an indicator, such as an asterisk symbol or alternative characters, to serve as an indicator that this field contains data content rather than actual dialed digits for an originated telephone call. An indicator of data content is not required for the present invention because Per Call authorization is set at the switch for the mobile station and appropriate call processing trigger (s) are set to replace the conventional Qualification Request message with an Origination Request message. In other words, the trigger event can be set at the switch itself to support the communication of the data content within the dialed digits field of certain cellular signals. This trigger event can be set at the switch prior to any issuance of a Call Origination signal carrying data content within the dialed digits field.

Exemplary Method for Transmitting Data in the Dialed Digits Field of a Cellular Network Control Channel Referring now to FIGS. 1 and 5, aspects of the present invention will be described in the context of an illustrative operating environment. At time "a", cellular communications device 29 issues a Call Origination signal 70 via the cellular network overhead control channel 38 to the MSC 24. The Call Origination signal 70 contains data content located within the dialed digits field of the conventional Call Origination signal.

In response to receiving the Call Origination signal 70, the MSC 24 determines that the cellular communications device 29 is associated with a "foreign" gateway and issues an Origination Request message 72 to the VLR 25 at time "b". The MSC 24 issues a Origination Request message rather than a Qualification Request message because of the prior setting of the appropriate call processing triggers at MSC 24. The dialed digits field of the Origination Request message comprises data content from the dialed digits field of the Call Origination signal 70 received by the MSC 24. In addition, the Origination Request message also can comprise the data content taken from the MIN and ESN field of the Call Origination signal. For example, if the cellular communications device 29 has inserted data content within the ESN field of the Call Origination Signal 70, this data content is placed by the MSC 24 within the ESN field of the Origination Request message.

At time "c", the MSC 24 forwards the Origination Request message 72 to the HLR 27. In this manner, the HLR 27 can receive data content within the dialed digits field and/or the ESN field. The HLR 27 may comprise a data collection system 40 for collecting the data parsed from the dialed digits field and/or the ESN field. The HLR 27 also can process the data content obtained from the Origination Request message 72.

Because the Origination Request message is intended for data communications rather than origination of a telephone call, the HLR 27 preferably denies authorization in response to the Origination Request message 72. Consequently, the HLR 27 issues at time "d" an Origination Request RETURN RESULT 74 with the Authorization Denied parameter. In response, the VLR 25 forwards the Origination Request RETURN RESULT message 74 at time "e". The MSC 24 responds by denying completion of the call origination and abandoning the processing of that call.

FIG. 6 illustrates the steps performed by the MSC in an exemplary method for transmitting data in the dialed digits field of a Call Origination signal. In Step 600, a trigger is provided at the MSC so that an Origination Request message is transmitted by the MSC in response to a Call Origination signal instead of a Qualification Request message. In Step 602 a Call Origination signal is received from a mobile station. A determination is made in Step 604 as to whether the Call Origination signal was received from a mobile station that is associated with a "foreign gateway," i.e. a "roamer". If the Call Origination signal was received from a roamer, then the method proceeds to Step 606. However, if the Call Origination signal was transmitted by a home unit, then the method proceeds to Step 614 and call processing for a home unit continues.

In Step 606, a determination is made as to whether the authorization period for the mobile station indicates that authorization is required. This determination is made by consulting the VLR database to determine the authorization period associated with the mobile station. Preferably, the authorization period is set to Per Call so that authorization is required for each call. If the determination in Step 606 is that authorization is required, then the method proceeds to step 608. Otherwise, the method proceeds to Step 616 and call processing continues.

In Step 608 the MSC/VLR transmits an Origination Request message to the HLR associated with the identified mobile station. An Origination Request RETURN RESULT denying authorization for the mobile station is received in Step 610. Because authorization is denied, the method proceeds to Step 612 where call processing is abandoned.

FIG. 7 illustrates the steps implemented by the HLR/data collection system in connection with an exemplary embodiment of the invention. In Step 700, the HLR associated with the identified mobile station receives the Registration Notification message from the MSC. In Step 702, a Registration Notification RETURN RESULT is transmitted to the MSC indicating that the authorization period for the device is Per Call. Steps 700 and 702 are performed as a result of the mobile station transmitting an Autonomous Registration signal to the MSC.

In Step 704 an Origination Request message is received from the MSC. In response, the HLR extracts data from the dialed digits field of the Origination Request message in step 706. The HLR system can also extract data from the ESN field of the Origination Request message. The determination as to which fields contain data is based on the MIN for the mobile station. Once the data has been extracted from the Origination Request message, then an Origination Request RETURN RESULT is transmitted indicating that authorization for the call is denied in step 708. Steps 704, 706 and 708 are performed in response to the mobile station transmitting a Call Origination signal to the MSC.

Therefore, in light of the above, it should be appreciated that the present invention provides a method and system for expanding the data payload of data messages transported via a cellular control channel. It should be understood that the particular embodiments described herein have been disclosed by way of example and that other modifications may occur to those skilled in the art without departing from the scope and spirit of the present invention.

I claim:

1. In a cellular mobile radiotelephone system, a method for transmitting data content from a cellular communications device to a data collection system, comprising the steps of:
   inserting data content into a dialed digits field of a call origination signal so that said dialed digits field is filled with said data content;
   transmitting said call origination signal from said cellular communications device to a mobile switching center
   in response to receiving said call origination signal, electing to send an origination request message rather than a qualification request message from said mobile switching switching center; and
   forwarding said data content from said mobile switching center to said data collection system via said origination request message.

2. The method of claim 1, wherein said data collection system comprises a home location register system.

3. The method of claim 1, wherein the forwarding step comprises forwarding said data content from said mobile switching center to a data collection system via an origination request message, and wherein a dialed digits field of said origination request message comprises said data content from said dialed digits field of said call origination signal.

4. The method of claim 1, wherein said data content further comprises an electronic serial number field of said call origination signal.

5. The method of claim 2, further comprising the step of: forwarding said origination request message from said home location register system to a data processing system.

6. The method of claim 5, further comprising the step of:
   in response to receiving said origination request message at said home location register system, transmitting an authorization denied message from said home location register system to said visitor location register system.

7. The method of claim 6, further comprising the steps of:
   in response to receiving said authorization denied message at said visitor location registration system, forwarding said authorization denied message from said visitor location register system to said mobile switching center; and
   transmitting a message from said mobile switching center to said cellular communications device denying completion of the call origination.

8. The method of claim 7, wherein said cellular communications device comprises a cellular mobile radiotelephone.

9. The method of claim 7, wherein said cellular communications device comprises a security system.

10. The method of claim 1, further comprising the step of:
    setting an authorization period to a per call authorization.

11. In a cellular mobile radiotelephone system, a method for transmitting data content from a cellular communications device to a data collection system, comprising the steps of:
    setting a trigger in a mobile switching center to instruct said mobile switching center to send an origination request message rather than a qualification request message in response to a call origination signal from said cellular communication device;
    receiving a call origination signal at said mobile switching center comprising data content located in a dialed digits field of said call origination signal from said cellular communications device;
    forwarding said data content from said mobile switching center to a data collection system.

12. The method of claim 11, wherein said data collection system comprises a home location register system.

13. The method of claim 12, further comprising the steps of:
    forwarding said data content from said home location register system to a data processing system.

14. The method of claim 11, further comprising the steps of:
    receiving an authorization denied message from a home location register system associated with said data collection system; and
    in response, abandoning call processing for said call origination signal.

15. The method of claim 11, further comprising the steps of:
    receiving a registration signal at said mobile switching center from said cellular communications device;
    transmitting a registration notification message to a home location register system associated with said data collection system; and
    receiving a message from the home location register system indicating that an authorization period for said cellular communications device is per call.

16. In a cellular mobile radiotelephone system, an apparatus for transmitting data content to a data collection system, comprising:
    a data source;
    a monitor operative to receive data from said data source; and
    a cellular communications device for
       receiving said data content from said monitor,
       inserting said data content into a dialed digits field of a call origination signal, and
       transmitting said call origination signal to a mobile switching center, wherein said mobile switching center is responsive to said call origination signal to transmit an origination request message, rather than a qualification request message, to the data collection system, the origination request message comprising the data content.

17. The apparatus of claim 16, wherein said monitor comprises a security system.

18. The apparatus of claim 16, wherein said data source comprises a global positioning system receiver.

19. The apparatus of claim 16, wherein said data source comprises a meter.

20. In a cellular mobile radiotelephone system, a system for transmitting data content from a cellular communications device to a data collection system, comprising:

a cellular communications device operative to transmit a call origination signal comprising data content located in a dialed digits field;

a mobile switching center operative to receive said call origination signal from said cellular communications device, and further operative to transmit a origination request message; and a visitor location register system operative to receive said origination request message, and further operative to forward said origination request message to a data collection system.

21. The system of claim 20, wherein said call origination signal may further comprise data content located in an electronic serial number field of said call origination signal.

22. The system of claim 21, wherein said data collection system comprises a home location register system.

23. The system of claim 22, wherein said home location register system is operative to transmit an authorization denied message to said visitor location register system in response to receiving said origination request message.

24. A method for transmitting data via a cellular network control channel, comprising:

providing a trigger that specifies that an origination request message is transmitted in response to a call origination signal;

receiving said call origination signal, said call origination signal having data in a dialed digits field of said call origination signal;

in response to said call origination signal, transmitting said origination request message to a remote cellular system, said origination request message having data in a dialed digits field of said origination request message;

receiving an authorization denied message from said remote cellular system; and abandoning call processing for said call origination message.

25. The method of claim 24, further comprising:

receiving a registration signal;

transmitting a registration notification signal to said remote cellular system;

receiving a registration notification message from said remote cellular system indicating that an authorization period is per call; and providing a database entry indicating that said authorization period is per call.

26. The method of claim 24, wherein transmitting said origination request message to a remote cellular system further comprises:

determining that the call origination signal was transmitted by a mobile station associated with said remote cellular system;

and determining that said authorization period for the mobile station is per call based upon the database entry.

\* \* \* \* \*

UNITED STATES PATENT AND TRADEMARK OFFICE
CERTIFICATE OF CORRECTION

PATENT NO. : 6,738,647 B1
DATED : May 18, 2004
INVENTOR(S) : Charles M. Link, II It is certified that error appears in the above-identified patent and that said Letters Patent is hereby corrected as shown below:

Column 25,
Line 33, "switching switching center; and" should read -- switching center; and --

Signed and Sealed this

Thirteenth Day of July, 2004

JON W. DUDAS
*Acting Director of the United States Patent and Trademark Office*